United States Patent
Russell et al.

(10) Patent No.: US 7,063,337 B2
(45) Date of Patent: Jun. 20, 2006

(54) CHILD CARRIER ASSEMBLY FOR A SHOPPING CART

(75) Inventors: Joseph W. Russell, 944 N. Butternut Cir., Frankfort, IL (US) 60423-2106; Eleobardo Moreno, St. John, IN (US)

(73) Assignee: Joseph W. Russell, Frankfort, IL (US)

( * ) Notice: Subject to any disclaimer, the term of this patent is extended or adjusted under 35 U.S.C. 154(b) by 120 days.

(21) Appl. No.: 10/754,241

(22) Filed: Jan. 9, 2004

(65) Prior Publication Data
US 2005/0151333 A1 Jul. 14, 2005

(51) Int. Cl.
*B62D 39/00* (2006.01)
(52) U.S. Cl. .......................... 280/33.993; 280/DIG. 4; 280/DIG. 3; 280/33.992; 280/47.23
(58) Field of Classification Search .......... 280/DIG. 3, 280/DIG. 4, 33.993, 33.992, 47.23
See application file for complete search history.

(56) References Cited

U.S. PATENT DOCUMENTS

| | | | |
|---|---|---|---|
| 2,689,133 A | 9/1954 | Goldman | 280/33.99 |
| 2,769,645 A | 11/1956 | Young | 280/33.99 |
| 2,813,725 A | 11/1957 | Hoedinghaus et al. | 280/33.99 |
| 2,837,344 A | 6/1958 | Young | 280/33.99 |
| 2,860,885 A | 11/1958 | Schweitzer | 280/33.99 |
| 2,890,059 A | 6/1959 | Brooks et al. | 280/33.99 |
| 2,891,801 A | 6/1959 | Sides | 280/33.99 |
| 2,896,959 A | 7/1959 | Young et al. | 280/33.99 |
| 2,911,227 A | 11/1959 | Davis | 280/33.99 |
| 2,931,662 A | 4/1960 | Young | 280/33.99 |
| 2,997,311 A | 8/1961 | Umanoff | 280/33.99 |
| 2,998,978 A | 9/1961 | Sides | 280/33.99 |
| 3,157,410 A | 11/1964 | Hummer | 280/33.99 |

(Continued)

FOREIGN PATENT DOCUMENTS

DE 34 44278 12/1984

OTHER PUBLICATIONS

Gary A. Smith, MD, DrPH; Ann M. Dietrich, MD; C. Teresa Garcia, MD; and Brenda J. Shields, MS, "*Injuries to Children Related to Shopping Carts*," PEDIATRICS, vol. 97, Feb. 2, 1996, pp. 161-165.

(Continued)

*Primary Examiner*—Christopher P. Ellis
*Assistant Examiner*—Cynthia F. Collado
(74) *Attorney, Agent, or Firm*—Wallenstein Wagner & Rockey, Ltd.

(57) ABSTRACT

A child seat assembly for use in a shopping cart and secured to the hinged rear gate of the shopping cart that is configured for lifting to expose a rear opening for nesting like carts. The child seat is secured in a lower portion of the shopping cart basket by hinged connections such that the seat assembly is moveable between a use and a non-use configuration, and the hinged connection of the seat back is within a sliding track arrangement with the support strut such that the hinged connection of the seat bottom and seat back travels in an upward arcuate path as the seat assembly is moved from a use position to a non-use position. The rear gate having at least one lower leg opening and an upper void region between the basket top and the seat bottom. The seat bottom at least partially covering the leg opening and the seat back covering the upper void region when the seat is in the non-use configuration.

49 Claims, 11 Drawing Sheets

U.S. PATENT DOCUMENTS

| | | | | |
|---|---|---|---|---|
| 3,361,438 | A | | 1/1968 | Davis ..................... 280/33.99 |
| 3,497,234 | A | * | 2/1970 | Schray .................. 280/33.993 |
| 3,931,984 | A | * | 1/1976 | Young ................... 280/33.994 |
| 3,963,255 | A | | 6/1976 | Trubiano ................ 280/33.99 |
| 4,084,832 | A | * | 4/1978 | Upshaw ................. 280/33.997 |
| 4,116,456 | A | | 9/1978 | Stover et al. ........... 280/33.99 |
| 4,125,270 | A | | 11/1978 | Trubiano ................ 280/33.99 |
| 4,423,882 | A | | 1/1984 | Stover et al. ........... 280/33.99 |
| 4,560,096 | A | * | 12/1985 | Lucas et al. ................ 224/411 |
| 4,682,782 | A | | 7/1987 | Mills ..................... 280/33.99 |
| 4,867,464 | A | | 9/1989 | Cook .................... 280/33.993 |
| 5,020,811 | A | * | 6/1991 | Ondrasik .............. 280/33.993 |
| 5,106,111 | A | * | 4/1992 | Ondrasik .............. 280/33.991 |
| 5,238,256 | A | * | 8/1993 | Ondrasik .............. 280/33.991 |
| 5,263,726 | A | | 11/1993 | Wood ................... 280/33.992 |
| 5,397,140 | A | * | 3/1995 | Mainard ................ 280/33.992 |
| 5,401,042 | A | * | 3/1995 | Ruger ................... 280/33.997 |
| 5,505,472 | A | * | 4/1996 | Trubiano .............. 280/33.993 |
| 5,702,114 | A | | 12/1997 | Downing et al. ........ 280/47.23 |
| 5,823,548 | A | | 10/1998 | Reiland et al. .......... 280/33.99 |
| 5,918,891 | A | | 7/1999 | Russell .................. 280/33.99 |
| 5,961,133 | A | | 10/1999 | Perry .................... 280/33.99 |
| 6,098,998 | A | | 8/2000 | Ondrasik ................ 280/33.99 |
| 6,641,147 | B1 | * | 11/2003 | Werner ................. 280/33.991 |
| 6,832,768 | B1 | * | 12/2004 | Duchene et al. ....... 280/33.993 |

OTHER PUBLICATIONS

U.S. Consumer Product Safety Commission article entitled *"Shopping Cart Safety Program Launched to Reduce Childhood Injures,"* May 1997, 2 pages, available at hppt://classaction.findlaw.com/recall/cpsc/filse/1977may/97117.html.

Website Product literature and specifications for Totecart, printed on Jun. 9, 2003 and Oct. 21, 2003, 8 pages, available at hppt://www.totecart.com.

Website Product literature and company history of Unarco Industries, Inc., printed on Oct. 21, 2003, 5 pages, available at hppt://www.uarco.com.

Website Product literature for carts manufactured by United Steel & Wire Company, printed on Oct. 21, 2003, 10 pages, available at hppt://www.unitedsteelandwire.com.

Website information for Technibilt, Ltd., printed on Oct. 26, 2003, 2 pages, available at hppt://www.technibilt.com.

* cited by examiner

CHILD CARRIER ASSEMBLY FOR A SHOPPING CART

TECHNICAL FIELD

The present invention relates to a child seat assembly for a shopping cart. More specifically, the invention described herein relates to a collapsible child seat assembly secured to the rear gate of a shopping cart to provide a lowered center of gravity for safety of a child placed in the seat.

BACKGROUND OF THE INVENTION

Shopping carts are often equipped with child carriers, providing a large chamber for carrying groceries or the like, and a seat for carrying a small child, or to hold a portable baby carrier such as the removable portion of a car seat assembly. Because of the large number of shopping carts that must be available in a store, it is necessary for the shopping carts to stack together in nesting arrangement. Nesting of the carts together results in like carts being inserted into one another to place at least a portion of the basket of one cart into that of another. Typically, this type of design includes a gated rear wall for the basket chamber, which lifts by the force of a basket of another cart being pushed against the gated wall, providing passage of the forced cart. It is important that the child seat of such a cart will not obstruct the ability for stacking of carts together, yet be readily accessible for the user to deploy for his or her child. This limitation of the device, to permit stacking of carts yet have an accessible child seat, poses a significant obstacle for designing a suitable device.

U.S. Pat. Nos. 2,813,725; 2,931,662; and, 2,890,059. The shopping cart devices of these patents, dating back to the introduction of the features in the 1950's, are very similar to the current popular cart and child seat devices. Some modifications to this design of cart devices have been introduced, such as that which disclosed in U.S. Pat. No. 5,020,811, without departure from the overall design and arrangement of the child seat mounted in a shopping cart.

More recently, there have been child seat designs introduced that address needed redesigns by placement of the child seat outside the shopping cart, providing the option of still utilizing the popular type of shopping cart as developed in the 1950's. Examples of these more recent devices with the seat secured outside the cart basket are depicted in U.S. Pat. Nos. 5,823,548 and 5,918,891 In the '548 patent, a conventional shopping cart is utilized, with attachment of a carrier to the rear of the cart. The design of the '548 patent, however, will not permit stacking of carts together, since the rear attachment blocks access to the rear gate of the cart. The '891 patent, on the other hand, provides a child seat mounted to extend outside the cart basket, and below the rear gate of the cart. Further, the '891 patent describes a child seat positioned outside the basket that also has a low center of gravity due to the seat bottom being located below the bottom of the cart basket.

Though various designs of shopping carts have been introduced through the years, it has been found that the industry is resistant to material departure from the conventional design of cart and child carrier. Aside from some level of use of the '548 patented device, there is an apparent resistance for the industry to embrace new design choices that depart from the popular design in use since the 1950's. This popular shopping cart design is constructed with a lower frame and a rectangular basket chamber that is narrow at one end and widens at the opposite end, usually at the rear portion of the cart. Front and rear casters secured to the bottom of the frame to provide mobility of the cart, and a handle is provided at the rear of the cart for the user to push the cart. The basket has a central chamber made up of basket walls and a gate pivotally mounted to serve as a rear wall, such that carts of similar design may be nested together whereby a second cart is pushed into the back of the first cart. Child seats for this type of cart usually have a secondary back wall structure that moves forward and rests in a forward position forming a V-shaped rear wall configuration. Popular versions of this type of cart design has a rear wall made of wire or plastic lattice, and the secondary wall being made up of an elongated support member secured to the bottom of the rear wall and extending to the top edge regions of the cart. The support member is secured at the bottom by a hinge that permits the support member to be deployed away from the wall to form a large V-shaped arrangement between the rear wall and the support member. A seat platform is attached so that it may be deployed to thereby be located between the diverging rear wall and the support member. Examples of this type of cart and child carrier device is shown at manufacturer web sites, such as the following: www.totecart.com; www.unarco.com; www.unitedsteelandwire.com; and www.technibilt.com.

This type of cart and seat assembly design, however, results in the child seat positioned with a high center of gravity, due to inherent limitations of the design. Since the seat is secured to the support member, which is deployed in a large V-configuration by pivoting about the hinge at the bottom of the rear wall, the seat cannot be placed very low in the cart basket, but instead must be positioned in the upper portion of the basket. The height of the seat is thereby dictated by the overall design, because the seat must be at a height in which the V-shaped rear wall configuration has ample depth to hold the seat platform between its diverging parts. This location for the child seat is believed to be potentially dangerous for children if a user were to leave a child unattended. This is due to the fact that the center of gravity for the child resides in the upper portion of the cart, and the fact that the child is seated near the open top edge of the cart basket. The resulting dangers include possibility of the cart tipping over due to unexpected and movement of the child's weight, such as a child leaning over or pulling on something outside the cart. Another potential danger of inadequate care by a user is that a child not properly secured by a safety strap may lean out of the cart or even stand on the seat platform and fall to the floor. Therefore, with the current popular design of shopping cart, the user must be in constant attendance to prevent such occurrences. Depending on the circumstances of the retail environment in which the device is used, the need for constant attendance at the cart and constant attention by the user, may not be possible or practical. Neither the user or the retailer finds benefit from this required level of care and attention. And, apparent from the statistics regarding shopping cart injuries, there is a significant need for an improved device to reduce the accidents that result.

According to a report of the Consumer Products Safety Commission, between 1985 to 1996, an annual average of 21,600 children under five years of age were treated in hospital emergency rooms due to falls when in a shopping cart. The report indicated that the frequency of fall related incidents has increased from 7,800 in 1985 to more than 16,000 in 1996. This report also indicated that 66 percent of the fall victims were treated in hospitals for head injuries. And, of those treated for head injuries, more than half suffered severe injuries such as concussions and fractures.

Therefore, there is a need for a new design for a shopping cart, one that provides a nestable cart with a lower positioned collapsible child seat. There is further a need for such a shopping cart device that otherwise is very similar in operation and appearance to existing popular devices, retaining the familiar structure of a swinging rear gate and a child seat mounted on the inside of the rear gate. In short, there is a need for a shopping cart child seat that is positioned in the lower portion of the cart basket when in use, and which is secured to a rear gate in a manner configured to collapse to permit stacking together of like carts. There is further a need for such a child seat to be positioned deeper within the shopping cart basket to prevent the child from falling out of the basket, while also providing a suitable location for a user to place an infant carrier (such as an infant car seat) for transporting by the shopping cart. And there is a need for a new child seat assembly, configured for locating in the lower portion of a cart basket, which is readily secured to the inside of the cart as a retrofit to an existing cart design, such as by replacing the rear gate with a newly configured seat and gate assembly. The present invention satisfies these needs.

SUMMARY OF THE INVENTION

The present invention provides an improved child seat carrier for a shopping cart, with a structure that provides increased stability for the shopping cart, and reduces the likelihood for a child to fall from the carrier. It is an object of the present invention to provide a collapsible child carrier for mounting to the rear gate of the cart to position the seat bottom in the lower portion of the shopping cart basket, and preferably in the lower third or quarter of the basket height.

It is also an object of the present invention to provide a child seat assembly with cantilevered support of the seat bottom, without the need for a support member extending from the seat bottom to the bottom of the cart back. Also, it is an object of the present invention to provide an assembly that is at least partially supported in the use position by a horizontally extending support strut that passes between the rear gate and the seat back.

It is also an advantage and object of this invention to provide an assembly that is located in the lower portion of the basket chamber in the use configuration and moveable to a storage configuration in which the hinge angle between the seat back and seat bottom is opened flat to rest the seat assembly against the rear gate.

Other advantages and aspects of the present invention will become apparent upon reading the following description of the drawings and detailed description of the invention.

DETAILED DESCRIPTION

Figure 1:
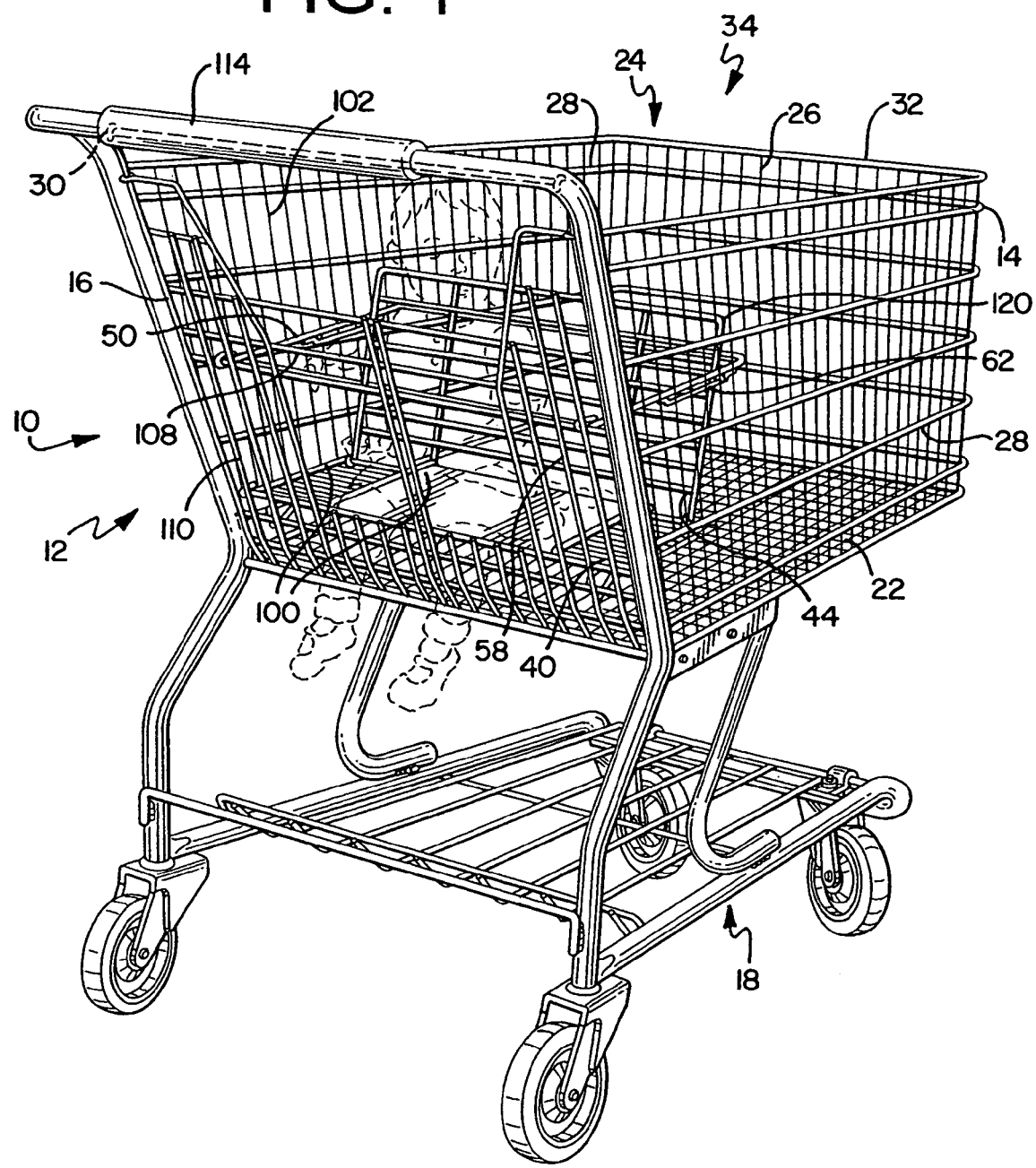
FIG. 1 is a perspective view of the shopping cart and child carrier assembly of the present invention.

The present invention provides a shopping cart and seat assembly 10 with cart child seat 12 that permits stacking of like carts together, with the child seat moveable to a use position wherein the child seat has a lowered center of gravity, and positioned deep inside the shopping cart basket 14. This structure, as is described in the details herein, provides a shopping cart child seat 12 with superior features than cart and child seat assemblies previously available, while retaining the important feature of carts being capable of nesting together through the gated rear gate 16 of carts.

In a preferred embodiment of the present invention, the shopping cart 10 and child seat assembly 12 includes a cart having a lower frame 18 that supports a basket 14 for the user to carry items for purchase, and a child seat 12 that is positioned in a lower portion 20 of the cart basket 14. As with conventional cart structures, the basket 14 is formed of a sidewall arrangement and a basket bottom 22. Since the preferred embodiment of the present invention is configured to be used with conventional cart designs, the basket sidewall arrangement 24 preferably includes a front wall 26, opposed side walls 28, and the rear gate 16. The rear gate 16 of this basket arrangement 24 is connected by a hinge 30 located at the upper portion of the basket 14. This type of shopping cart basket 14 has a basket height H—H defined by the distance between the basket bottom 22 and the upper edge 32 of the basket sidewalls 24, at the area of the rear gate hinge 30. Therefore, the distance between the basket bottom 22 and the open top edge 32 of the basket defines the height of the basket chamber 34, and the footprint area of the basket bottom 22 defines the surface area of the basket chamber 34.

In the preferred form of this invention, the child seat assembly 12 is configured to be used in a popular conventional type of shopping cart. In this manner, the rear gate 16 is configured to pivot about the hinge 30 to provide an opening of the basket sidewall arrangement 24. Such pivoting movement of the rear gate 16 provides access into the basket chamber 34 for receiving a portion of the basket 14 of a like cart, for telescope nesting of similar shopping carts. The child seat 12 of the present invention is configured to be secured to the rear gate 16, though it is preferred that the rear gate 16 of the present invention has structural modifications from that of traditional carts, as is explained herein.

Figure 2:
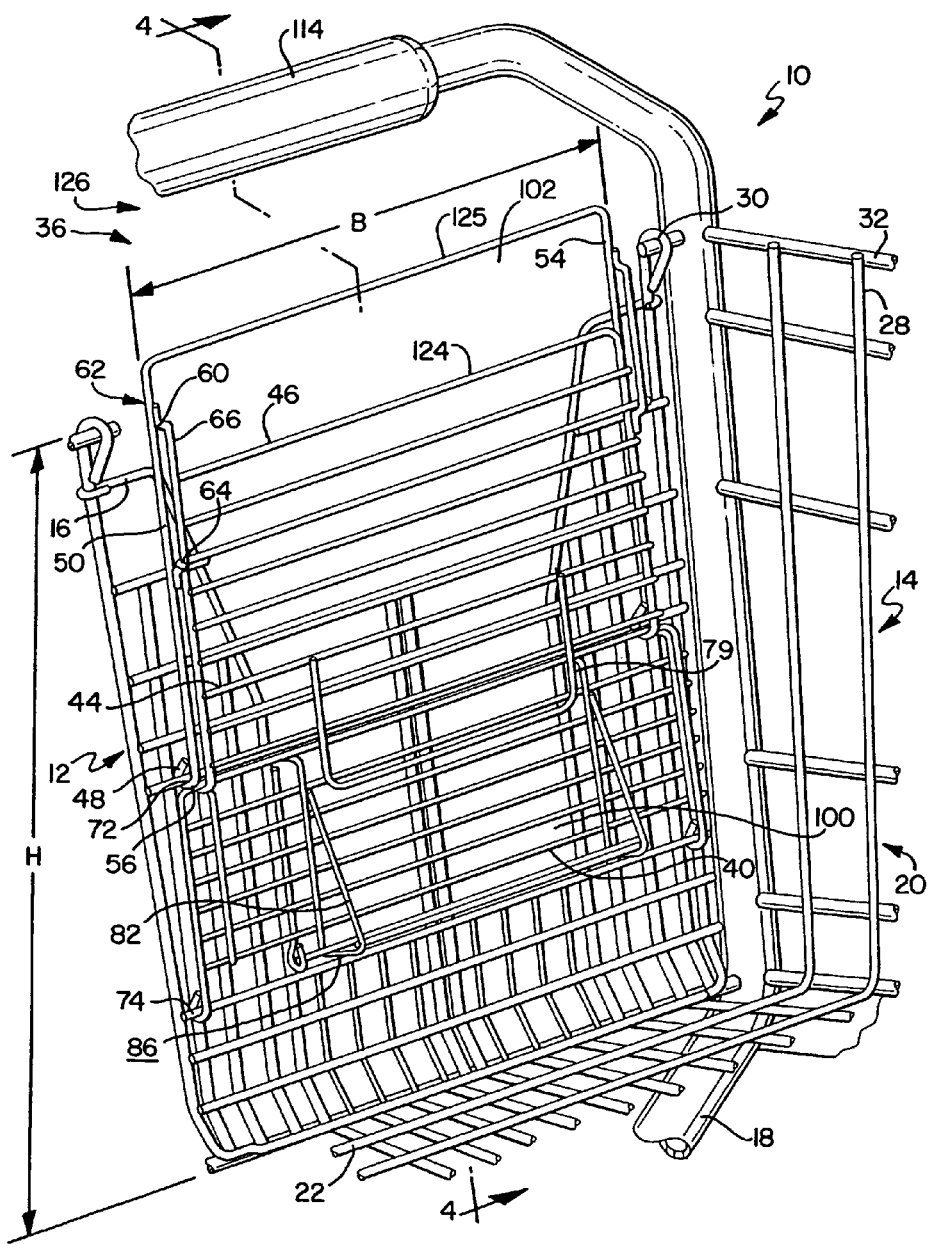
FIG. 2 is a partial sectional view of the assembly shown in FIG. 1, when the child seat assembly is moved into the non-use or storage position and is thereby positioned in tandem with the rear gate wall.
Figure 3:
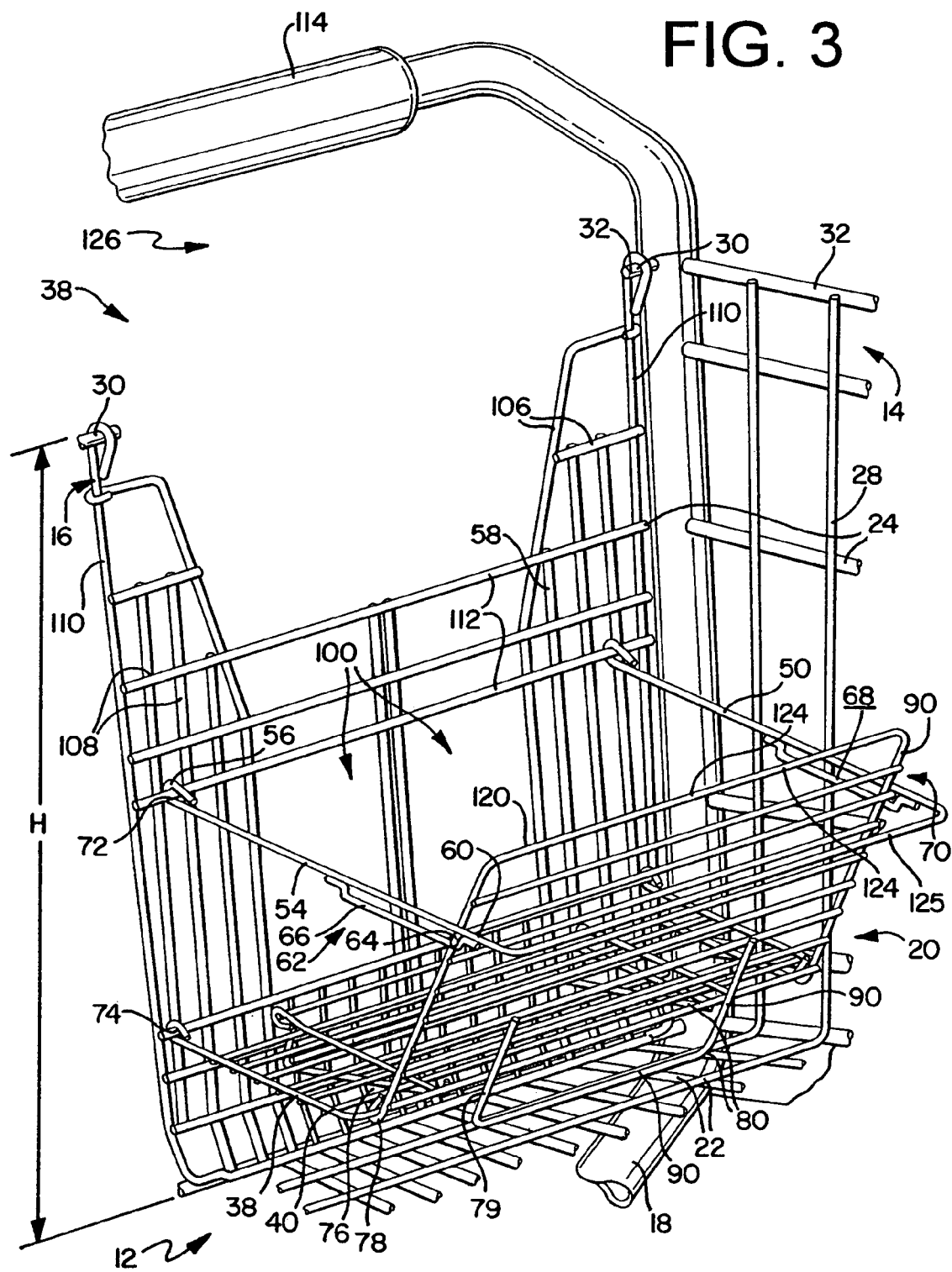
FIG. 3 is a partial sectional view of the assembly shown in FIG. 1, when the child seat assembly is deployed to the use position and thereby has a seat platform that resides generally along a horizontal plane and strut members extending generally horizontally between the rear gate wall and the seat back.

Also, in the preferred embodiment of this invention, the child seat 12 is moveable between a stowed non-use position 36 (FIG. 2) to a use position 38 (FIG. 3). When the seat assembly is in the use position 38 and the seat bottom 40 resides along a generally horizontal plane 42, the seat bottom is positioned in the lower portion 20 of the basket chamber 34, preferably at a place below half the height H—H of the basket 14. When placed in such a low position in the basket 14, the cart assembly 10 has a relatively greater stability as compared with conventional designs, when a child is placed in the seat assembly 12 and the cart 10 is pushed during shopping. It is preferable that the seat bottom 40 is located below the lower half of the basket chamber 34, to reside in the use position in the lower one-third portion of the chamber 34 at or below one-third of the basket height H—H.

Certain structural details of the present invention provides a child seat 12 that is configured to be moved from the stored configuration 36 to the use configuration 38. Movement between such configurations is achieved by structural details that provides pivotal movement of the seat back 44 relative the rear gate 16 and a sliding movement of the seat back 44 in engagement with an auxiliary support arm, shown in the figures as a pivotable support strut 50 that deploys to a substantially horizontally extended position. Accordingly, when the seat assembly 12 is placed in the use configuration 38, the seat back 44 is hingedly connected to the seat bottom 40, and the top 46 of the seat back 44 is hingedly connected 48 to a generally horizontally extending support strut 50 that passes between the rear gate 16 to the seat back 44. When in the seat back 44 is captured into position deployed in the use configuration 38 by cooperation of the hinged connection 48, the top of the seat back 44 is preferably positioned below the upper third of the height H—H of the basket chamber 34. Further, when the seat assembly 12 is deployed to the use configuration 38, the entire seat bottom 40 and seat back 44 are located withing the shopping cart basket chamber 34, and located in the lower portion 20 of the basket 14 to thereby be surrounded by the sidewall arrangement 24 and have sidewall extend to a height well above the seat bottom 40. When deployed to the use position 38, the strut member 50 resides along a substantially horizontal plane. In this manner, the support strut 50 has an end secured to the rear gate 16 at a location above the seat bottom 40, and extends to an opposed end that is connected to the seat back 44. In a preferred form of the invention, the seat bottom 40 is located approximately 14 to 18 inches down from the top 32 of the basket walls 24, in the range of two-thirds the distance between the basket top 32 and the basket bottom 22. In this arrangement, the seat assembly 12 is surrounded by sidewalls 24 deep in the basket 14, providing surrounding protection for the child and inability for a child to lean out from the edge of the cart basket 14. This further provides a low center of gravity for the seat assembly 12, such as when a child or an infant carrier 52 (in phantom) is placed in the seat assembly 12. When an infant carrier 52 is placed in the child seat assembly 12 of this invention, the spaced relationship between the rear gate 16 and the seat back 44 provides cooperative support for the carrier 52. In this manner, it is preferable for the top 46 of the central area rear gate 16 to be located generally at the same height of the top 46 of the seat back 44 as the assembly 12 is positioned within the basket 14.

Figure 7:
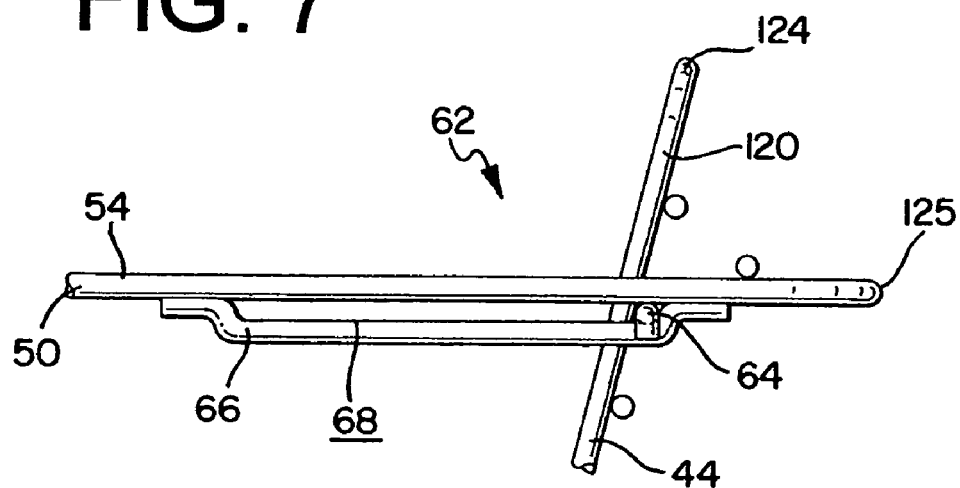
FIG. 7 is a side view of the tracking arrangement between the support strut and the seat back of the seat assembly shown in FIG. 1, wherein the seat is in the use configuration (FIG. 5) and seat back is extended on the track.

The strut member 50 is preferably formed as an elongated wire 54 that is connected to the rear gate 16 with a loop 56 of the wire material 54 that captures a potion of the rear gate lattice 58, with an opposed end 60 of the support strut 50 being connected to the seat back 44. As is shown in detail in FIG. 7 the sliding movement of the seat assembly 12 is preferably constructed from a slide track arrangement 62, including a slide component 64 of the seat back 44 in combination with a track potion 66 of the strut member 50. The slide component 64 of the seat back 44 is cooperatively dimensioned to slide along a guide surface 68 provides an elongated guide surface that slidingly mates with the track portion 66 of the strut member 50. This arrangement for sliding movement of the seat assembly is unlike any mating slide surfaces of conventional devices. This slide track assembly 62 provides a sliding mating surfaces at the location of the hinged connection 70 between the horizontal support strut 50 and the seat back 44. This provides movement of the rotational axis of the hinge 70 connecting between the seat back 44 and the support strut 40. As described and shown in the embodiment of the Figures, this slide track arrangement 62 is between a slide component 64 of the seat back 44 and the elongated guide surface 68 of the support strut 40, however this arrangement may be altered or even reversed while to provide movement of the hinged connection 70. For example, the track arrangement 62 may be achieved by reversing the mating components (64 and 66), with the slide component being located on the support strut 50 and the track surface being located on the seat back 44. Also, the moveable hinge line 70 of connection of the strut member 50 of FIGS. 3 and 7 may include additional moveable hinge connections, such as the hinged connection 72 of strut member 50 to the rear gate 16, or the hinged connection 74 of the seat bottom 40 to the rear gate 16. This may be done without departing from a significant feature of the present invention—structure providing a seat assembly 12 that deploys between a storage configuration 36 and a use configuration 38, wherein a hinged connection 48 of the seat back has a track arrangement 62 for movement of the hinge axis along the track. This arrangement provides structure wherein the seat back 44 may be deployed to the use configuration 38 and have the seat back 44 reside in a place that is tilted forward of the vertical axis. In other words, the seat back 44 in the use configuration 38 is capable of having an obtuse hinge angle 76 relative the seat back 44. This provides a seat back 44 that is slanted from the vertical plane for comfort and fit when in use with a child in the seat 12. When the seat assembly 12 is thereafter moved to the non-use configuration 36, the track arrangement 62 provides a guide for movement of the hinge line 48 so the seat bottom 40, strut member 50, and seat back 44 are configured to rest flat against the rear gate 16. Without the track guided movement of the hinged axis 48 between the assembly components, the flat non-use arrangement 36 of the assembly would not be available for an assembly in which the seat back 44 rests in a forward position when in use.

Figure 4:
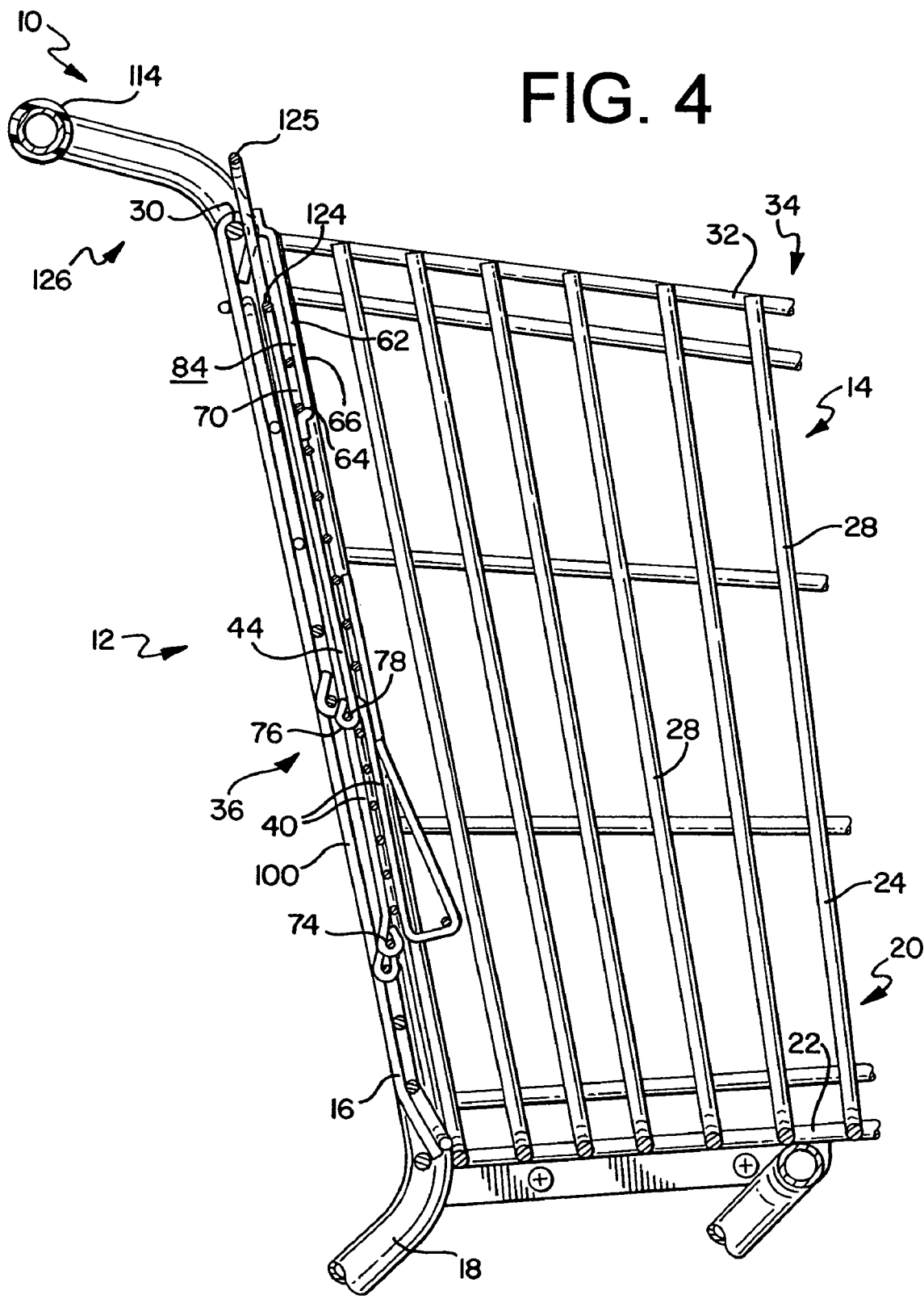
FIG. 4 a sectional view of the assembly shown in FIG. 2, viewed along sectional line 4—4.
Figure 9:
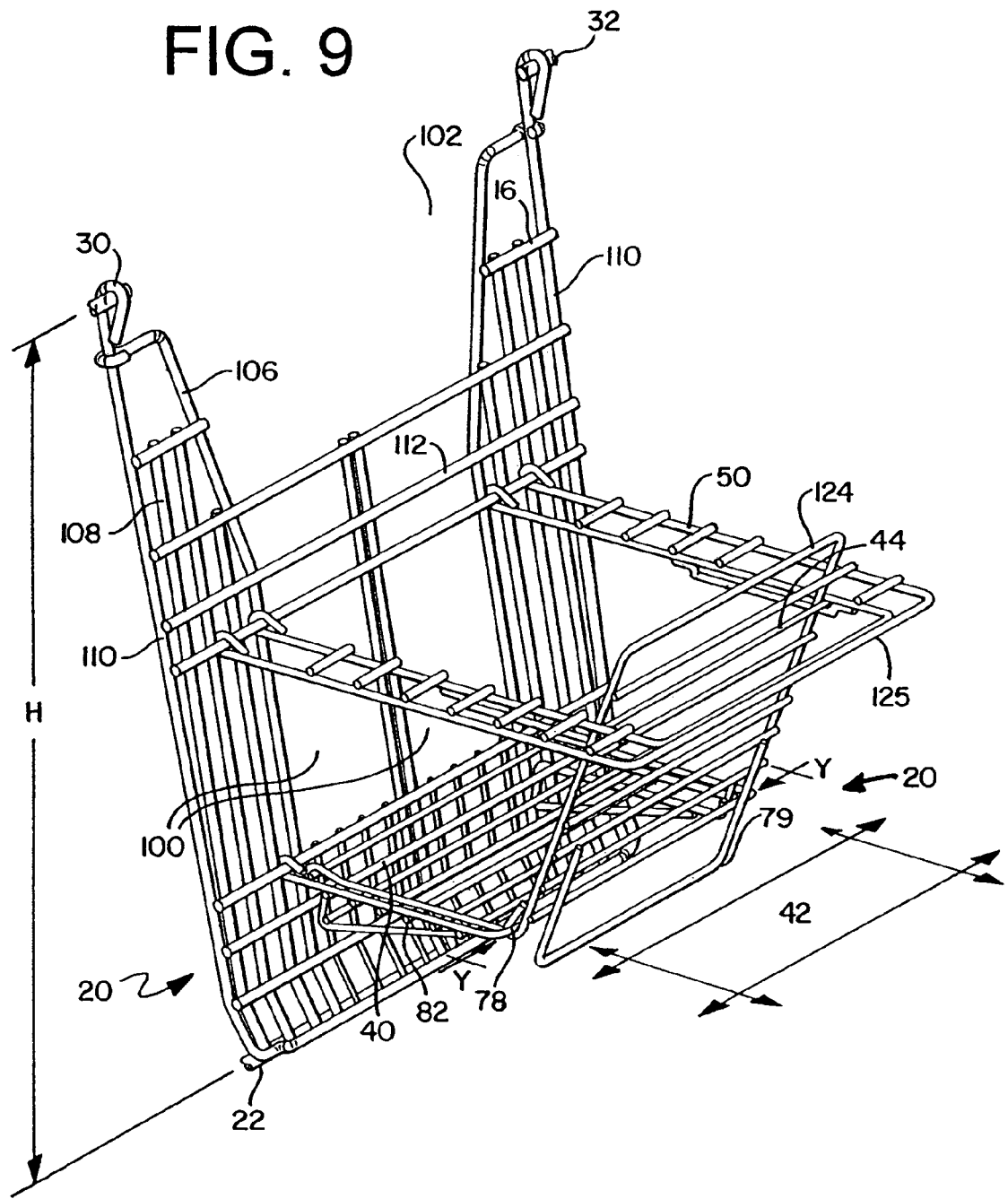
FIG. 9 is an alternative embodiment of the child seat assembly configured for attachment to a rear gate such as shown in FIGS. 1 and 3, with widened strut members to provide arm rests and the seat assembly being in the use position.
Figure 10:
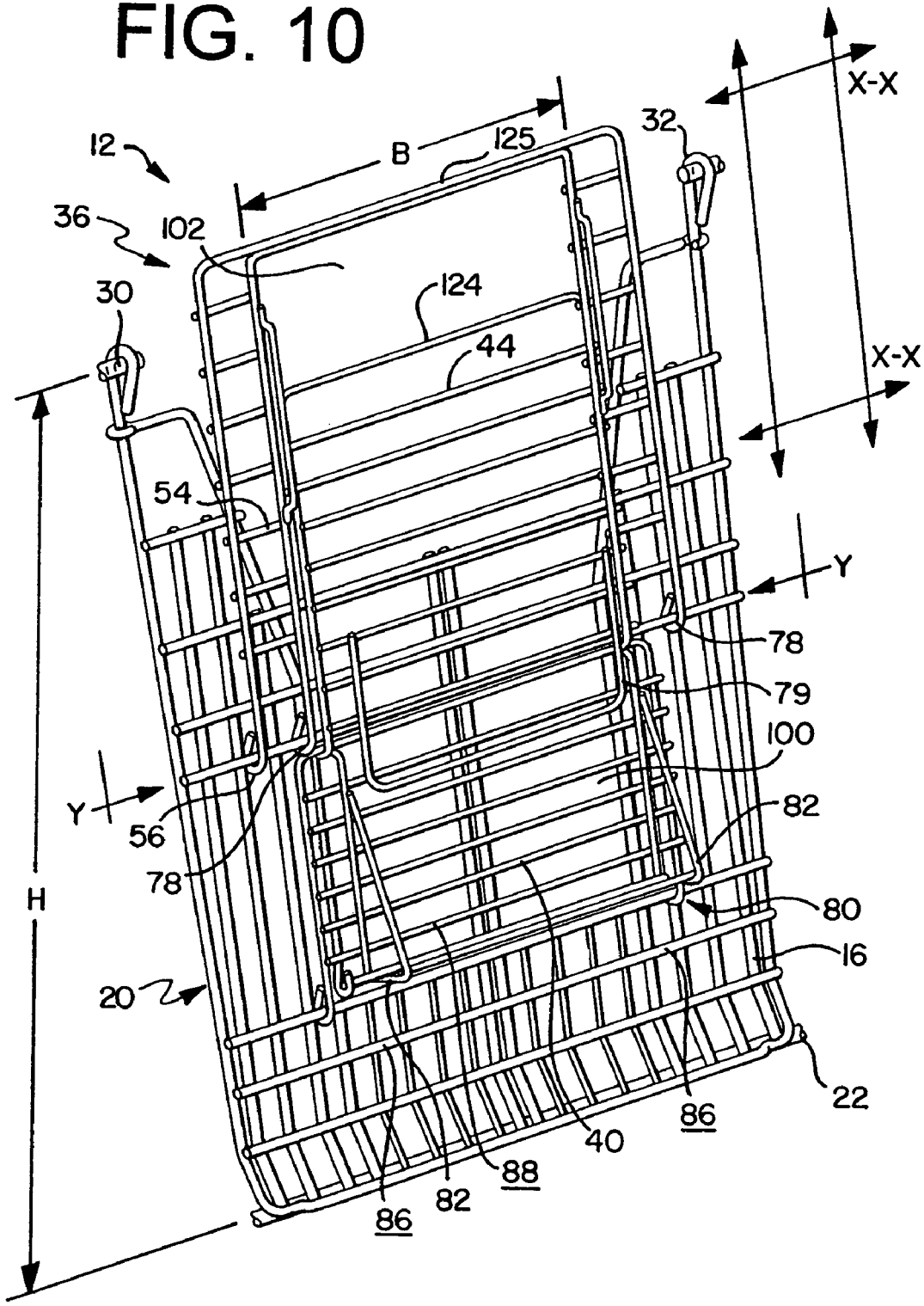
FIG. 10 is a view of the assembly of FIG. 9, with the seat assembly being moved to the non-use position.
Figure 11:
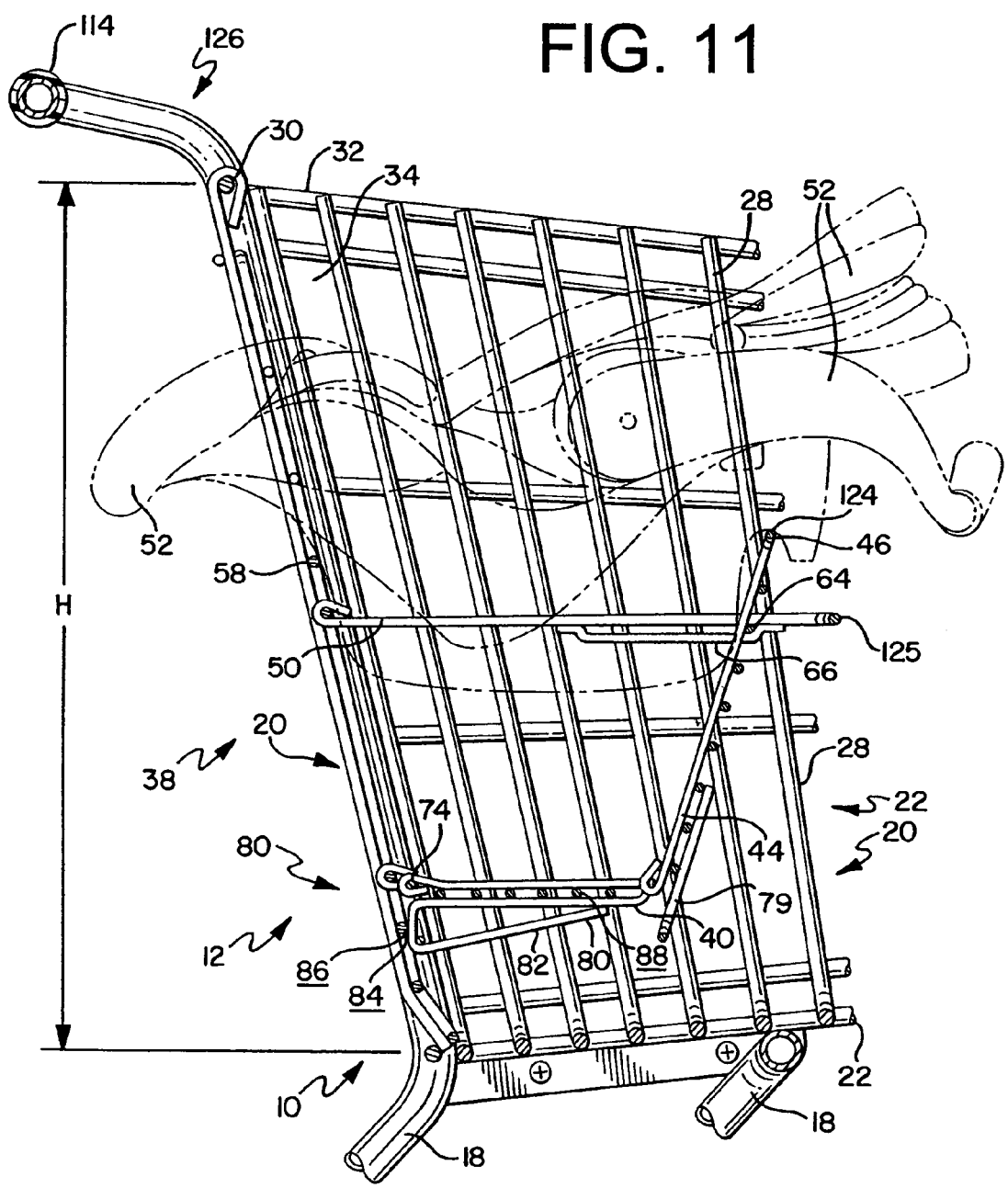
FIG. 11 is a side view as in FIG. 5, with the addition of a popular infant carrier in position withing the seat assembly shown in dashed lines.

When the seat assembly 12 is placed in the storage position 36, i.e., placed in a first position in which the seat back and bottom are collapsed and nest against the rear gate for storage and for lifting of the gate as shown in FIGS. 2 and 4, at least a major extent of the seat back 44, seat bottom 40 and support strut 50 preferably reside together along a common plane X—X. Alternatively, these components of the assembly 12 rest stacked together substantially flat against the rear gate 16 for storage in the non-use configuration 36. Unlike conventional shopping cart child seat devices, the seat back 44 and bottom 40 are in hinged connection 78 along a hinge axis Y—Y (FIGS. 9 and 10), whereby the hinge angle 76 between the back and bottom is opened to 180 degrees when the seat is stored 36 flat along the gate 16 (FIGS. 4, 10). This unique arrangement of the seat assembly 12 in the storage configuration 36 is achieved by the structure of the invention that permits movement of the seat 12 in-and-out of deployment, whereby the seat is not connected to any extension of the assembly to the bottom portion of the rear gate, such as the structure found in prior art type of devices. Rather, it is supported by the combination of the horizontally extending strut 50 and a lower support assembly 80.

In the preferred embodiment, a stop or blocking component is provided to prevent the hinged connection 78 between the seat back 44 and bottom 40 from inverting, preventing the hinge angle 76 from extending greater than 180°. In the embodiment shown in the Figures, the blocking component includes a tail portion 79 extending from the seat back 44, which makes contact with a portion of the underside of the seat bottom 40 when the assembly is collapsed to the non-use configuration, such as is shown in FIG. 10. This structure thereby provides a means for preventing inversion of the seat back/bottom hinge 78, by preventing the hinge angle 76 from exceeding 180°.

An alternative but very similar structure for such a means of preventing inversion of the seat back/bottom hinge 78, include other places for positioning the blocking member. For example, a blocking member may extend from the seat bottom 40 to make contact with the back side of the seat back 44. Alternatively, the blocking component to prevent hinge 78 inversion may be secured immediately adjacent the hinge 78, to restrict over-extension of the hinge angle 76.

When the seat assembly 12 is moved by deployment into the use configuration 38 (FIGS. 3, 5, and 9), the hinge angle 76 of hinged connection 78 between the seat back 44 and bottom 40 is reduced, and the seat bottom 40 is moved into position in the lower region 20 inside the basket chamber 34. In this aspect of the present invention, when the seat assembly 12 is moved from the use position 38 into the stored configuration 36, the hinge angle 76 between the back 44 and bottom 40 is opened, increasing the angle 76 of the hinged connection 78 between the seat bottom 40 and the seat back 44. By this movement, the assembly 12 is placed in tandem with the rear gate 16, whereby the seat bottom 40 is located below the seat-back hinge axis Y—Y, and the seat back 44 is raised above the hinge axis Y—Y of the seat-back hinged connection 78, thereby also being positioned in tandem with the rear gate 16. Accordingly, when the seat assembly is in the final movement into the storage configuration 36, the seat back 44 and bottom 40 generally reside along a common plane X—X which lies adjacent the rear gate 16 and rests against the gate 16 for free movement of the rear gate 16 upward for stacking like carts.

In a preferred form of the present invention, the seat assembly 12 deployed to the use configuration 38 is supported without need for a support member extending to the gate bottom, such connection by a support member that pivots from the bottom of the gate such as is found in conventional devices. Instead, the present invention has cooperative support structure provided by the upper strut 50 and a lower support assembly 80 with a lower body 82 protruding from the seat bottom 40 that is mounted to, or otherwise integral with, the seat assembly 12. The lower body member 82 has an engagement surface 84 that is configured to mate with and engage against a cooperatively positioned mating surface 86 of the cart basket 14. The lower body member 82 preferably extends from the bottom surface 88 of the seat bottom 40, and thereby moves with the seat assembly 12 when deployed between the use 38 and storage 36 positions. When the seat 12 is deployed to the use position 38, the support strut 50 extends along a substantially horizontal plane, and the lower body member 82 extends from the seat bottom 40 toward the basket sidewall 28 or bottom 22 to bring the engagement surface 84 into contact with the mating surface 86 of the basket 14.

Figure 5:
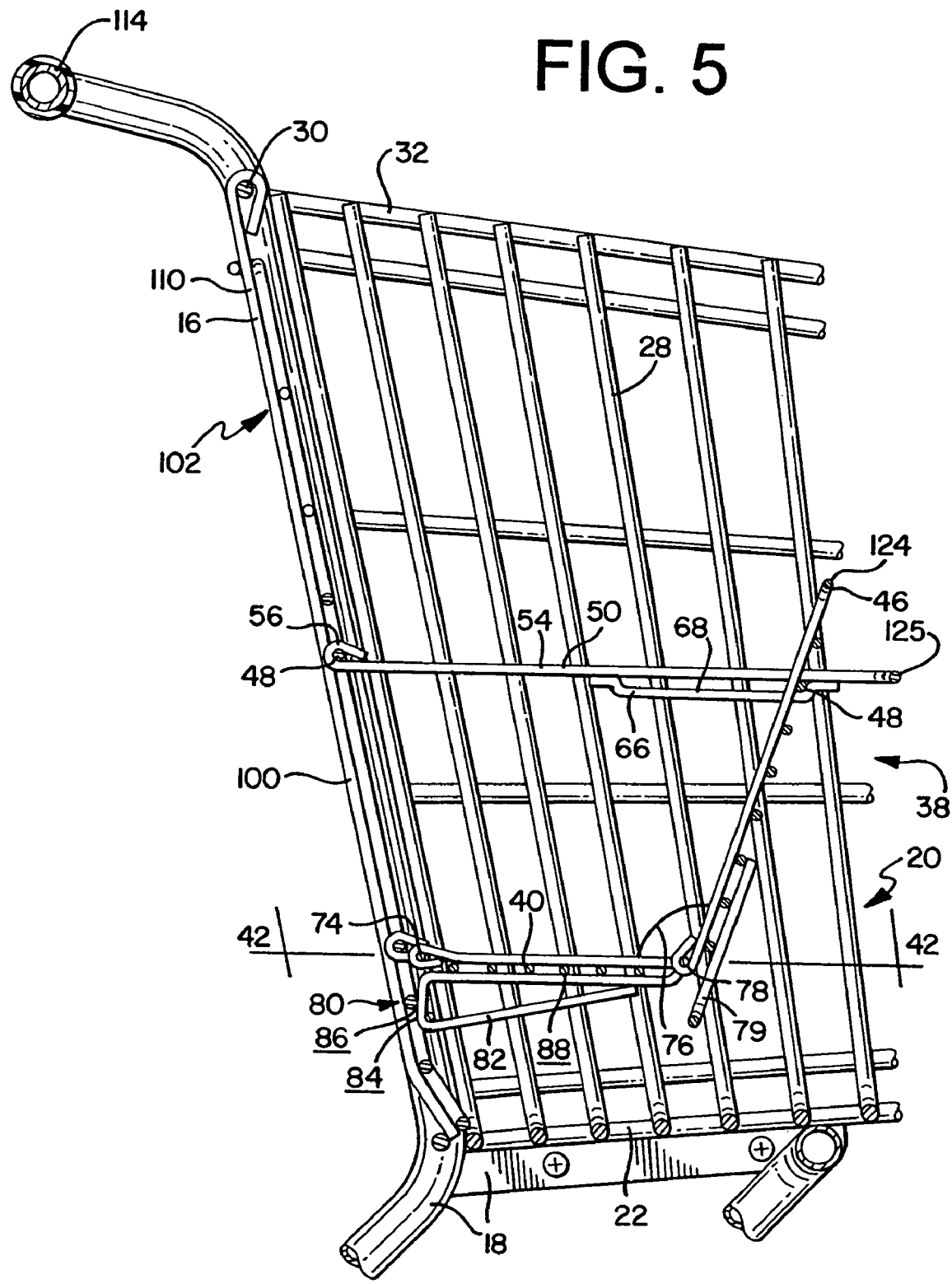
FIG. 5 is a sectional view of the assembly shown in FIG. 3 with the assembly deployed to the use position, viewed along sectional line 5—5.
Figure 8:
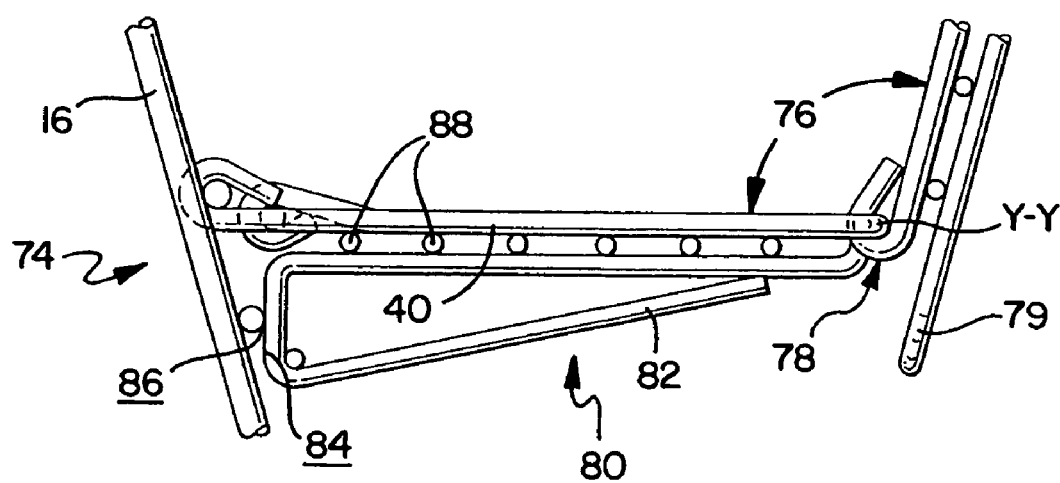
FIG. 8 is a side view of the seat and lower support of the assembly shown in FIG. 1, with the seat assembly in the use configuration and the lower support engaged in cantilevered support against the rear gate of the shopping cart.

In one aspect of the present invention, the support (engagement) 84 surface of the seat assembly 12 depends from the seat bottom 40 in a direction toward the rear gate 16, such as is shown in detail in FIGS. 5 and 8. As shown in the Figures, this depending structure 82 provides cantilevered support. The engagement surface 84 extends from the seat assembly in a direction transverse to the plane of the seat bottom 40, to mate against the rear gate 16 as a surface 86 substantially parallel an extent of the rear gate 16. In the preferred form of this embodiment, the lower body member 82 includes a portion formed as an angle bracket secured to the seat bottom 40 to provide the cantilevered support. Further, this embodiment preferably utilizes an arrangement of at least two such angle brackets to provide more than one location of cantilevered support under the seat bottom 40. In this embodiment, the support surface 84 includes more than a single continuous surface that engages with the basket rear gate 16, and instead comprises a plurality of surfaces 84 that in combination provide support against the rear gate, such as having one supporting body member positioned adjacent each side of the seat bottom 40.

Figure 12:
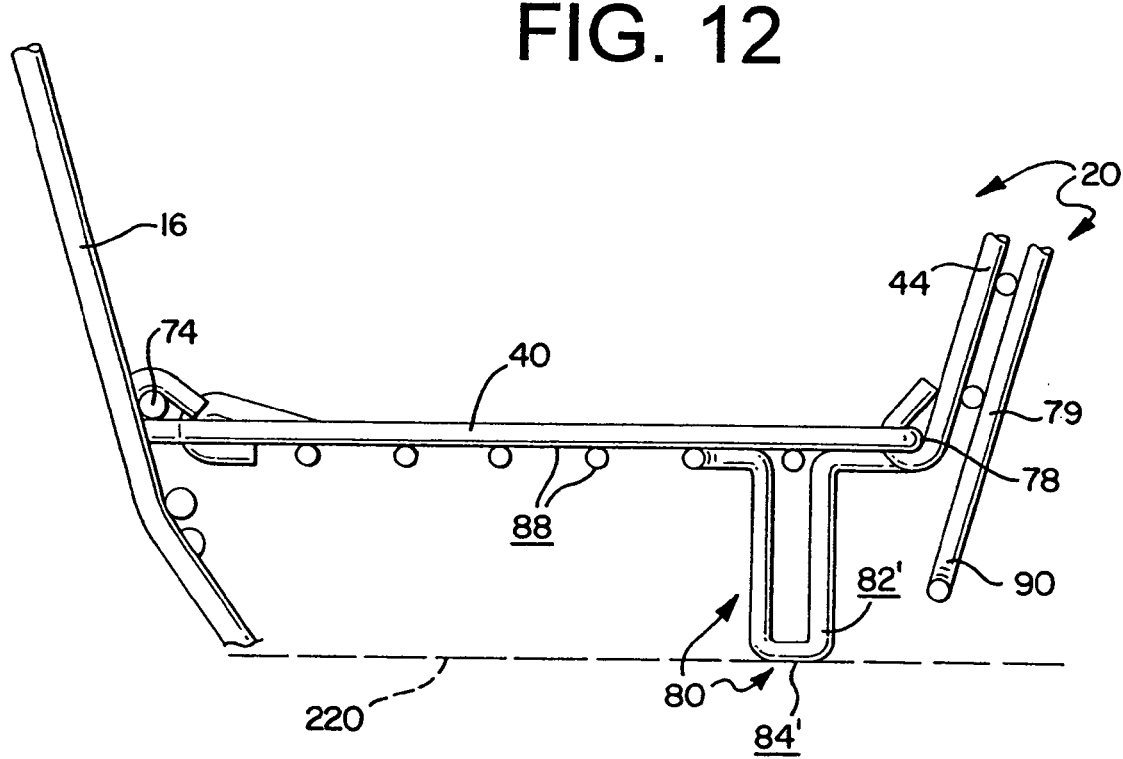
FIG. 12 is a side view of an alternative embodiment to the device shown in FIG. 8, with the lower support being positioned to engage the bottom wall of the cart basket to support the seat assembly in the use position.

In another form of the present invention, the support surface 84 of the lower body member 82 is configured to engage the bottom wall 22 of the basket 14. In this embodiment, shown in FIG. 12, the depending body structure 82' has an engagement surface 84' that extends generally parallel a major extent of the planar surface of the seat bottom 40. The lower support body 82' has an extent that extends from the seat bottom 40 toward the basket bottom wall 220 when the seat bottom 40 is in the use position 38. The engagement surface 84' is thereby configured to engage with the mating surface of the basket bottom 220. When the seat assembly 12 is moved into the storage (non-use) configuration 36, the seat bottom 40 is moved to reside in a generally vertical plane adjacent the rear gate 16, and the support body 82' thereby extends into the basket chamber 34 from the underside of the seat bottom 40. In this embodiment, the assembly preferably includes at least two such support bodies 82, and preferably includes at least one such body member located at each side of the seat bottom 40.

An alternative embodiment of this type of supporting assembly 80 may be provided as an extension 90 of the seat back 44, to extend below the seat bottom 40 when the seat is in the use position 38. This may done by adapting the tail portion 79 of the seat back 44 to engage a portion of the basket bottom 22 when the seat is deployed for use 38 (see FIG. 3). This embodiment also has the benefit of providing a lower support body like that discussed above 82' that protrudes downward from the seat bottom 40 when the seat is deployed (as in FIG. 3), and yet is configured to rest flat against the rear gate 16 when the seat is in the storage configuration 36 (such as is shown in FIG. 2). Of course, it is also possible, and potentially advantageous, for the seat assembly 12 to provide a combination of the two alternative depending body members, providing cantilevered support against the rear gate 16 and support against the basket bottom 22.

The rear gate 16 is preferably constructed of a lattice 58 of material such as is typical of conventional cart structures. This lattice structure 58 may be formed of plastic, or formed of metal wire or rod. The lattice structure 58 of the rear gate 16 has at least one leg opening 100 that is positioned in the lower region 20 of the basket chamber 34, located in an area immediately above the position of the seat bottom 40 in the use configuration 38. The leg opening or openings 100 thereby consist of a lower void area of the lattice structure 58, located in a position to accommodate the legs of a child when placed in the seat 12 deployed into the lower portion 20 of the cart baasket 14.

In the preferred form of the present invention, the rear gate 16 has an upper void region 102 located above the leg opening(s) 100, providing an open area that extends up to the area of the gate hinge 30. This void region 102 provides an open area of the gate, preferably as an opening in the rear gate lattice 58, below the top 46 of the seat back 44 when the seat is deployed 38. This provides an opening 102 in the area of the upper body of a child placed in the child seat 12. Preferably, the void region 102 of the gate is below the handle 104 of the cart 10, and has a width sufficient for providing space for the child's head and upper torso, whereby the child is otherwise surrounded by the cart basket arrangement 24 and the seat back 44. Also, in the preferred embodiment, the void region 102 has no crossbar of the cart, such as the conventional cart structure at the rear gate hinge. The void region 102 of the rear gate 16 has a width of an opening that is less than the full width of the lattice 58 of the rear gate 16, such that the seat back 44 substantially covers the upper opening 102 when the seat assembly in the non-use (storage) configuration 36 against the rear gate. In the embodiment shown in the Figures (see FIG. 3), this arrangement of an upper opening 102 is formed by having upper connection members 106 extend from the rear gate hinge 30 are toward the full lattice body portion 108 of the rear gate 16 located below the upper void region 102. In the preferred embodiment, the top of the central region 112 of the rear gate 16 is at a height compatible with the height of the top 46 of the seat back 44. This provides cooperative support between the rear gate 16 and the seat back 44 for supporting an infant carrier 52. Thus, the void region 102 has a configuration for permitting the width of an infant carrier 52 to be placed in the basket 34 and rest on the assembly 12. In the embodiment shown in FIG. 3, the upper connection members 106 consist of elongated portions of the lattice material 58, such as the wire forming the rear gate 16. The upper connection members 106 extend from the top of the rear gate 16 at the hinge area 30, with some of the wire connection members 106 extending at an angle from the side 110 of the gate 16 to the central region 112 of the rear gate 16. This arrangement of angled connection results in a structure in which the upper opening 102 that is wider at the top and gradually angles inward for the lattice 58 to fill the intermediate region 112 of the rear gate 16 located above the leg opening(s) 100.

The handle 114 of the cart 10 may be elevated relative to conventional cart devices, to a greater height above the top 32 of the basket 16, and may even be elevated higher than that which is depicted in the Figures. In such an embodiment, a lesser amount of void region 102 than shown in the Figures may be suitable for providing space for the upper body of the child, without departing from the structure of the present invention. Nevertheless, this aspect of the present invention is practiced by providing the structure of a void region 102 of the rear gate 16, in which an extent of the rear gate 16 lattice 58 has a height less than that of the basket chamber 34, i.e., below the height of the basket top 32. In order to provide a cart assembly 10 suitable for use when the seat assembly 12 is in the non-use position 36, and avoid potential for items in the basket 14 to fall through an opening (100 and 102) in the rear wall of the cart, the seat assembly is configured to collapse against the rear wall (the rear gate) to substantially cover both the upper opening 100 and the leg opening(s) 102. In the embodiment shown in the Figures, the seat bottom 40 moves against the rear gate 16 to cover a major extent of the leg opening(s) 100, and the seat back 44 moves against the rear gate 16 to cover at least a major portion of the upper opening 102.

In this embodiment, an upper extended member 120 connected to the seat back 44, such as an attached elongated wire 122 passing across the width B-B of the seat back 44, protrudes above the seat back 44 when the seat is in the storage position 36. The upper extended member 120 provides a gripping portion 124 for the user to utilize for moving the seat 12 from the use position 38. In the embodiment shown in Figures, a second gripping bar 125 extends from the strut members 50, as an extended portion from at least one strut member 50 located forward of the seat back 44. When in the non-use position 36, the second gripping bar 125 is located in an area above the top 32 of the rear gate 16 and below the height of the cart handle 114. When the rear gate 16 is lifted during cart stacking by rotating the rear gate 16 about the gate hinge 30, the second gripping bar 125 of the seat assembly 12 rotates with the rear gate 16 and passes through the open region 126 between the cart handle 114 and the rear gate hinge 30. Thus, the upper extended portion 120 of the seat back 44 and the gripping bar 125 of the strut member(s) 50 provide handles 114 for deploying the seat 12 between use 38 and non-use 36 positions, without obstruction of movement of the rear gate 16 when nesting carts together.

Figure 6:
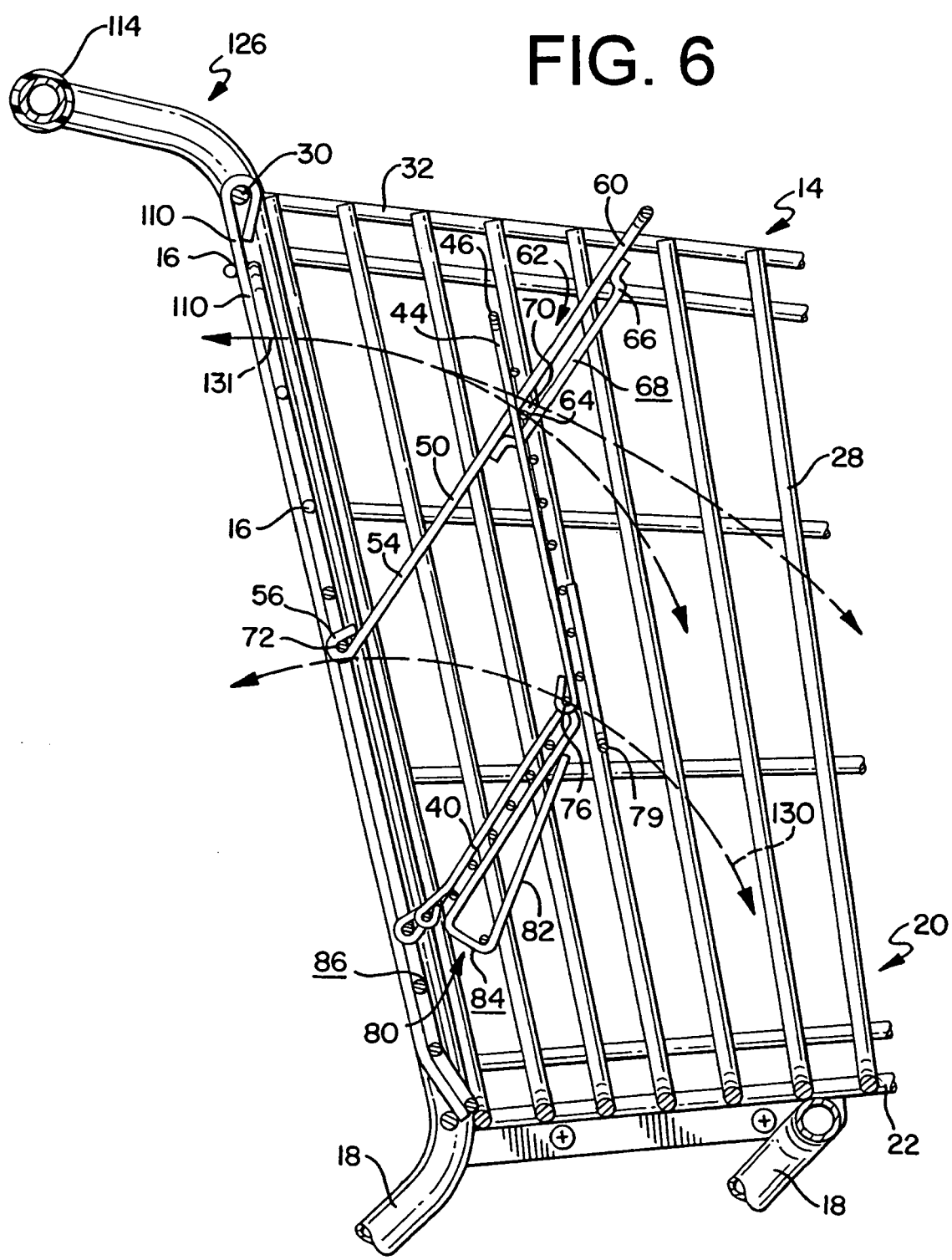
FIG. 6 is a sectional view of the assembly, in the same sectional view of FIGS. 4 and 5, wherein the seat assembly is in a position between the storage configuration (FIG. 4) and the use position (FIG. 5)

Further details of the structure and use of the present invention is shown by the structural comparison between FIGS. 2 and 4 as compared to FIGS. 3 and 5–6. As shown in these Figures, one aspect of the present invention is to provide a hinged connection of the seat in which the hinged connection 78 between seat bottom 40 and the seat back 44 travels in an upward arcuate path 130 when moved from the use position 38 to the non-use position 36 (see FIG. 6). In conventional cart assemblies with hinged connection between the seat bottom and the seat back, movement of the hinged connection of those parts moves along a general horizontal line, and does not move to an elevated height against the rear gate. In distinction, in the present invention, the hinged connection 78 between the seat back 44 and the seat bottom 40 move upward in the basket chamber 34 toward the top of the basket 32, as the assembly 12 is collapsed against the rear gate 16. Also, the seat assembly of the present invention is unique in that the hinged connection of the seat back to the support strut 50, which is located at the slide track arrangement 62, has a construction that permits movement of the hinged connection as the assembly is moved into the use position. This movement of the hinged connection between the seat back 44 and bottom 40 permits the hinge to move away from the rear gate as the seat is deployed for use. The structure of the present invention that permits such arcuate movement 131 of the hinge connection 48 is the extent of the sliding arrangement 62 between the seat back 44 and the support strut member 50. As the seat back 44 is moved toward the rear gate 16, the seat back 44 moves upward, toward the basket top 32, due to movement of the hinged connection 76 of the seat back 44 to the strut member 50. This structure, and resulting arcuate path of hinged connection provides a child seat assembly which may be significantly lowered into use position 38 so the assembly 12 is located in the lower portion of the cart basket chamber. And this structure provides a seat assembly that is deployed for use and the seat back 44 is tilted back from the vertical plane to provide a reclining seat back 44.

While the specific embodiments have been illustrated and described, numerous modifications come to mind without significantly departing from the spirit of the invention and the scope of protection is only limited by the scope of the accompanying claims.

What is claimed is:

1. A shopping cart and child seat assembly, comprising;
   a cart having a lower frame supporting a basket formed of a sidewall arrangement and a basket bottom, the sidewall arrangement having a basket height extending between the basket bottom and an upper edge defining an open top of the basket;
   at least an extent of a sidewall of the basket having a gate, the gate having a gate height between the basket bottom and an upper hinged connection, the gate being pivotal about said hinged connection to provide an opening of the basket sidewall arrangement for insertion of a portion of a similar shopping cart;
   a child seat assembly secured to said gate and moveable between a storage position to a use position, said seat assembly in the use position having the seat bottom resides along a generally horizontal plane positioned below half of said height of the basket.

2. The cart and seat assembly of claim 1, wherein, the seat bottom in the use position is positioned no greater than one third of the basket height up from the basket bottom.

3. The cart and seat assembly of claim 1, wherein, the seat bottom in the use position is positioned in the lower quarter of said basket height.

4. The cart and seat assembly of claim 1, wherein, the seat bottom in said use position is located less than 6 inches above the basket bottom.

5. The cart and seat assembly of claim 1, wherein, the seat bottom in the use position is located approximately 3–5 inches above the basket bottom.

6. The cart and seat assembly of claim 1, wherein, the seat assembly in the storage configuration, is positioned against the gate with the seat back located above the seat bottom.

7. The assembly of claim 1, wherein, the seat bottom and seat back reside along a common plane when the seat assembly is in the storage position.

8. The assembly of claim 7, wherein, an extent seat bottom and seat back and strut member lies in a common plane when the seat assembly is in the storage position.

9. The assembly of claim 1, wherein, the seat assembly is at least partially supported in the use position by a strut member located above the seat bottom and extending generally horizontally between the gate and said seat back.

10. A shopping cart and child seat assembly, comprising;
    a cart having a lower frame supporting a basket formed of a sidewall arrangement and a basket bottom, the sidewall arrangement having a basket height extending between the basket bottom and an upper edge defining an open top of the basket, said bottom and sidewall arrangement defining a basket chamber;
    at least an extent of a sidewall of the basket having a gate, the gate having a gate height located between the basket bottom and a gate hinge at a top region of the gate;
    a child seat assembly secured to said gate and having a seat bottom portion and a seat back portion, the child seat assembly being moveable between a storage configuration and a use configuration for use of the seat, said seat assembly in said second configuration having the seat bottom and seat back positioned in a bottom region of the basket chamber.

11. The assembly of claim 10, wherein, said seat bottom in said use position is located in the lower third of the basket chamber and said seat back extends generally upward from the seat bottom to a top of the seat back, said top of the seat back being positioned below the upper third of the basket chamber.

12. The assembly of claim 10, wherein the seat back and seat bottom are connected in hinged relationship, whereby said seat back and seat bottom in the storage position generally reside along a common plane.

13. The assembly of claim 12, wherein the seat back and seat bottom positioned in said common plane substantial planar alignment is positioned tandem said gate.

14. The assembly of claim 10, wherein, the gate has at least one leg opening in the lower region of the basket chamber, and a void region located between said leg opening and said gate hinge, said void region including an opening of the gate.

15. The assembly of claim 14, wherein, the seat assembly in said storage position at least partially covers the opening in the gate at the void region.

16. The assembly of claim 10, wherein, the seat assembly in the storage configuration is positioned adjacent the gate with the seat back being located above the seat bottom.

17. The assembly of claim 10, wherein, the seat assembly is at least partially supported in the use configuration by a strut member located above the seat bottom and extending generally horizontally between the gate and said seat back.

18. A shopping cart and child seat assembly, comprising;
    a cart having a lower frame supporting a basket formed of a sidewall arrangement and a basket bottom, the sidewall arrangement having a basket height extending between the basket bottom and an upper edge defining an open top of the basket, said bottom and sidewall arrangement defining a basket chamber;
    at least an extent of a sidewall of the basket having a gate, the gate having a gate height located between the basket bottom and said top of the basket;
    a child seat assembly secured to said gate and having a seat bottom portion and a seat back portion in hinged connection to the seat bottom, said seat assembly is moveable from a use configuration wherein the seat back is generally transverse a major extent of said seat bottom and the seat bottom is located in the bottom portion of the cart, to a storage configuration wherein said hinged connection is opened for the seat back and seat bottom to substantially reside along a common plane and positioned adjacent the gate.

19. The assembly of claim 18, wherein the hinged connection between the seat back and seat bottom is configured to be moved in an upward arcuate path when the seat assembly is moved from the use position to the storage position.

20. The assembly of claim 18; wherein, the hinged connection between the seat back and seat bottom defines an axis of angular displacement of said seat bottom to said seat back, the angular displacement of said axis being approximately 180 degrees when the seat assembly is in said storage position.

21. The assembly of claim 18, wherein, the seat back is located above the seat bottom when the seat assembly is in the storage configuration.

22. The assembly of claim 18, wherein, the seat bottom is in the lower third of the basket when the seat assembly is in the use position.

23. The assembly of claim 18, wherein, the seat assembly is at least partially supported in the use configuration by a strut member located above the seat bottom and extending generally horizontally between the gate and said seat back.

24. The assembly of claim 22, further comprising means for restricting angular displacement of the seat bottom to seat back to not exceed 180°.

25. A combination rear gate and collapsible child seat assembly for a shopping cart, comprising,
    a rear gate wall configured to form a rear wall of a shopping cart and having an upper hinged connection thereto for movement of the gate pivotal about the hinged connection;
    a seat assembly formed of a seat bottom secured to a seat back by a hinged connection, the seat back being connected to the rear gate by at least one strut member located above the seat bottom, said strut having a first portion secured to the gate and a second portion secured to the seat back;
    said seat assembly being moveable between a storage configuration wherein the assembly lies generally flat against the rear gate and a use configuration wherein the seat bottom resides in a generally horizontal plane, the assembly being at least partially supported in said use configuration by the connection of said strut extending from the rear gate to the seat back.

26. The assembly of claim 25; wherein, the seat assembly in the storage configuration is positioned along the rear gate with the seat back located above the seat bottom.

27. The assembly of claim 26; wherein, the seat back and seat bottom are in hinged connection with a hinge angle along the hinged connection defined between the back and bottom, said hinge angle being substantially 180 degrees when the assembly is in the storage configuration.

28. The assembly of claim 27; further comprising, means for restricting the hinge angle to not exceed 180°.

29. The assembly of claim 28; wherein, said means for restricting the hinge angle includes a blocking member extending from the seat back.

30. A rear gate child seat assembly for a shopping cart, comprising,
    a rear gate wall configured to be secured to a shopping cart basket and having an upper hinged connection thereto for movement of the gate pivotal about the hinged connection;
    a seat assembly formed of a seat bottom cooperatively dimensioned with a seat back, said seat back and bottom being in hinged relationship with a seat hinge axis, the seat assembly configured for movement from a use position located in the lower portion of the gate and moveable to a storage configuration, said assembly in the storage configuration having said seat hinge axis located adjacent the rear gate and having said seat back positioned above the seat hinge axis with the seat bottom below said seat hinge axis.

31. The assembly of claim 30, wherein, the seat bottom is located in the lower portion of the shopping cart basket when in the use position.

32. The assembly of claim 30, wherein, the seat bottom is located in the lower third of the shopping cart basket when in the use position.

33. The assembly of claim 30, wherein, the rear gate has a void region located above the seat assembly to provide an opening for an upper torso of a child.

34. The assembly of claim 30, wherein, the seat assembly in the storage configuration is positioned against the gate with the seat back located above the seat bottom.

35. The assembly of claim 30, wherein, the seat assembly is at least partially supported in the use configuration by a strut member located above the seat bottom and extending generally horizontally between the gate and said seat back.

36. A combination rear gate and collapsible child seat assembly for a shopping cart, comprising,
    a rear gate wall configured to form a rear wall of a shopping cart and having an upper hinged connection thereto for movement of the gate pivotal about the hinged connection;
    a seat assembly formed of a seat bottom secured to a seat back by a hinged connection wherein the seat assembly is moveable between a collapsed configuration to rest against the rear gate to a use configuration wherein the seat resides along a generally horizontal plane and the seat back is positioned a distance away from the rear gate to provide space for positioning a child in the seat assembly in a lower portion of the gate;
    said seat back being connected to the rear gate by at least one elongated strut member located above the seat bottom, said strut member having a first portion secured to the gate and a second portion connected to the seat back, said strut member having an extent positioned generally along a horizontal plane when said seat is in the use position.

37. The assembly of claim 36, wherein, said at least one strut member is positioned adjacent the rear gate when the seat is in said collapsed configuration.

38. The assembly of claim 36; wherein, the seat back is hingedly connected to the strut member with a guide track arrangement configured for movement of the hinged connection away from the rear gate as the assembly is moved to the use configuration.

39. The assembly of claim 36; wherein, two strut members are secured to the seat back and positioned at each side of the seat back.

40. A child seat assembly for a rear gate of a shopping cart, comprising;
    a seat bottom platform and a seat back platform with a hinged connection to the seat bottom, said hinged connection having a hinge angle defined by the angle between the seat platform and the back platform, said seat assembly being collapsible between a use configuration wherein the seat back is generally transverse to the bottom, and a non-use configuration wherein said hinge angle is increased as the hinged connection is opened, such that the seat back and seat bottom reside substantially flat and along a common plane.

41. The assembly of claim 40; wherein, the assembly is at least partially supported in the use configuration by at least one strut member extending between the seat back and the rear gate in a location entirely above the seat bottom platform.

42. The assembly of claim 41; wherein, the strut member is positioned along a substantially horizontal plane when the assembly is in the use configuration.

43. A combination rear gate and collapsible child seat assembly for a shopping cart, comprising, a rear gate configured for securement to a rear portion of a shopping cart and having an upper gate hinge segment for connecting to the cart with a pivotal hinged connection, said rear gate having a wall region with at least one leg opening;

a seat assembly formed of a seat bottom secured to a seat back by a hinged connection wherein the seat assembly is moveable between a collapsed configuration to rest against the rear gate to a use configuration for the seat to reside along a generally horizontal plane and the seat back is positioned a distance away from the rear gate to provide space for positioning a child in the seat assembly in the bottom portion of the rear gate and with the seat bottom located below the at least one leg opening;

wherein said wall region of the rear gate has a void region providing a shoulder region opening for a child, said opening being located below the gate hinge and above the leg opening.

44. The assembly of claim 43, wherein, the seat assembly in the storage configuration is positioned along the rear gate with the seat back located above the seat bottom.

45. The assembly of claim 44; wherein, the seat back and seat bottom are in hinged connection with a hinge angle along the hinged connection defined between the back and bottom, said hinge angle being substantially 180 degrees when the assembly is in the storage configuration.

46. The assembly of claim 45; further comprising, means for restricting the hinge angle to not exceed 180 degrees.

47. The assembly of claim 43; wherein, the seat back is connected to the rear gate by at least one strut member located above the seat bottom, said strut member having a first portion secured to the gate and a second portion with a guide surface engaged with a mating surface of the seat back, the engagement of said guide surface of the strut and the mating surface of the seat back is configured to provide a guide track arrangement for movement of the seat back relative the rear gate.

48. The assembly of claim 46, wherein, said strut member is positioned adjacent the rear gate when the seat is in the storage configuration, and the strut member extends from the rear gate to the seat back positioned a distance away from the rear gate when the seat assembly is moved to the use configuration.

49. The assembly of claim 43; wherein, said at least one leg opening is configured to provide openings for more than one child.

* * * * *